(12) United States Patent
Behravan et al.

(10) Patent No.: US 11,470,597 B2
(45) Date of Patent: Oct. 11, 2022

(54) CONFIGURED GRANTS IN TIME DIVISION DUPLEX COMMUNICATIONS

(71) Applicant: Telefonaktiebolaget LM Ericsson (publ), Stockholm (SE)

(72) Inventors: Ali Behravan, Stockholm (SE); Zhenhua Zou, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 183 days.

(21) Appl. No.: 16/960,486

(22) PCT Filed: Jan. 11, 2019

(86) PCT No.: PCT/EP2019/050700
§ 371 (c)(1),
(2) Date: Jul. 7, 2020

(87) PCT Pub. No.: WO2019/138079
PCT Pub. Date: Jul. 18, 2019

(65) Prior Publication Data
US 2021/0068086 A1 Mar. 4, 2021

Related U.S. Application Data

(60) Provisional application No. 62/616,679, filed on Jan. 12, 2018.

(51) Int. Cl.
*H04W 72/04* (2009.01)
*H04L 5/00* (2006.01)
*H04W 72/12* (2009.01)

(52) U.S. Cl.
CPC ......... *H04W 72/042* (2013.01); *H04L 5/0053* (2013.01); *H04W 72/0446* (2013.01); *H04W 72/1289* (2013.01)

(58) Field of Classification Search
CPC ........... H04W 72/042; H04W 72/0446; H04W 72/1289; H04L 5/0053
(Continued)

(56) References Cited

U.S. PATENT DOCUMENTS

2019/0199424 A1\* 6/2019 Li ................... H04L 43/0852
2019/0364602 A1\* 11/2019 Yl .................... H04W 72/04

OTHER PUBLICATIONS

International Search Report and Written Opinion dated May 16, 2019 for International Application No. PCT/EP2019/050700 filed on Jan. 11, 2019, consisting of 14-pages.
(Continued)

*Primary Examiner* — Peter G Solinsky
(74) *Attorney, Agent, or Firm* — Christopher & Weisberg, P.A.

(57) ABSTRACT

A method, system and apparatus are disclosed. A wireless device for communication with a network node is provided. The wireless device is configured with a periodic uplink and downlink configuration. The wireless device includes processing circuitry configured to: receive an indication of a scheduling of a first resource; determine that the scheduling conflicts with a function of the first resource according to the periodic uplink and downlink configuration; and transmit on a second resource that differs from the periodic uplink and downlink configuration and that is different from the first resource where the transmission is based on the determination of the conflict.

20 Claims, 9 Drawing Sheets

(58) Field of Classification Search
USPC .......................................................... 370/329
See application file for complete search history.

(56) References Cited

OTHER PUBLICATIONS

3GPP TSG RAN WG1 Meeting #91 R1-1721674; Title: Offline discussion on GC-PDCCH carrying SFI; Source Qualcomm Incorporated; Agenda Item: 7.3.1.3; Document for: Discussion and Decision; Location and Date: Reno, USA, Nov. 27-Dec. 1, 2017, consisting of 18-pages.
3GPP TSG RAN WG1 Meeting #91 R1-1720192; Title: On semi-static and dynamic signalling of SFI; Source: CATT; Agenda Item: 7.3.1.3; Document for: Discussion and Decision; Location and Date: Reno, USA, Nov. 27-Dec. 1, 2017, consisting of 7-pages.
3GPP TSG RAN WG2 #100 R1-1712305; Title: RAN WG's progress on NR WI in the October meeting 2017; Source: NTT Docomo, Inc. (Rapporteur); Agenda Item: 10.1—organisational; Document for: Information; Location and Date: Reno, USA, Nov. 27-Dec. 1, 2017, consisting of 101-pages.
3GPP TS 36.211 V14.4.0; 3rd Generation Partnership Project; Technical Specification Group Radio Access Network; Evolved Universal Terrestrial Radio Access (E-UTRA); Physical channels and modulation (Release 14); Sep. 2017, consisting of 197-pages.
3GPP TS 36.321 V8.12.0; 3rd Generation Partnership Project; Technical Specification Group Radio Access Network; Evolved Universal Terrestrial Radio Access (E-UTRA); Medium Access Control (MAC) protocol specification (Release 8), Mar. 2012, consisting of 47-pages.
3GPP TS 36.321 V14.9.0; 3rd Generation Partnership Project; Technical Specification Group Radio Access Network; Evolved Universal Terrestrial Radio Access (E-UTRA); Medium Access Control (MAC) protocol specification (Release 14); Dec. 2018, consisting of 110-pages.
3GPP TS 36.331 V14.4.0;3rd Generation Partnership Project; Technical Specification Group Radio Access Network; Evolved Universal Terrestrial Radio Access (E-UTRA);Radio Resource Control (RRC); Protocol specification (Release 14); Sep. 2017, consisting of 753-pages.

* cited by examiner

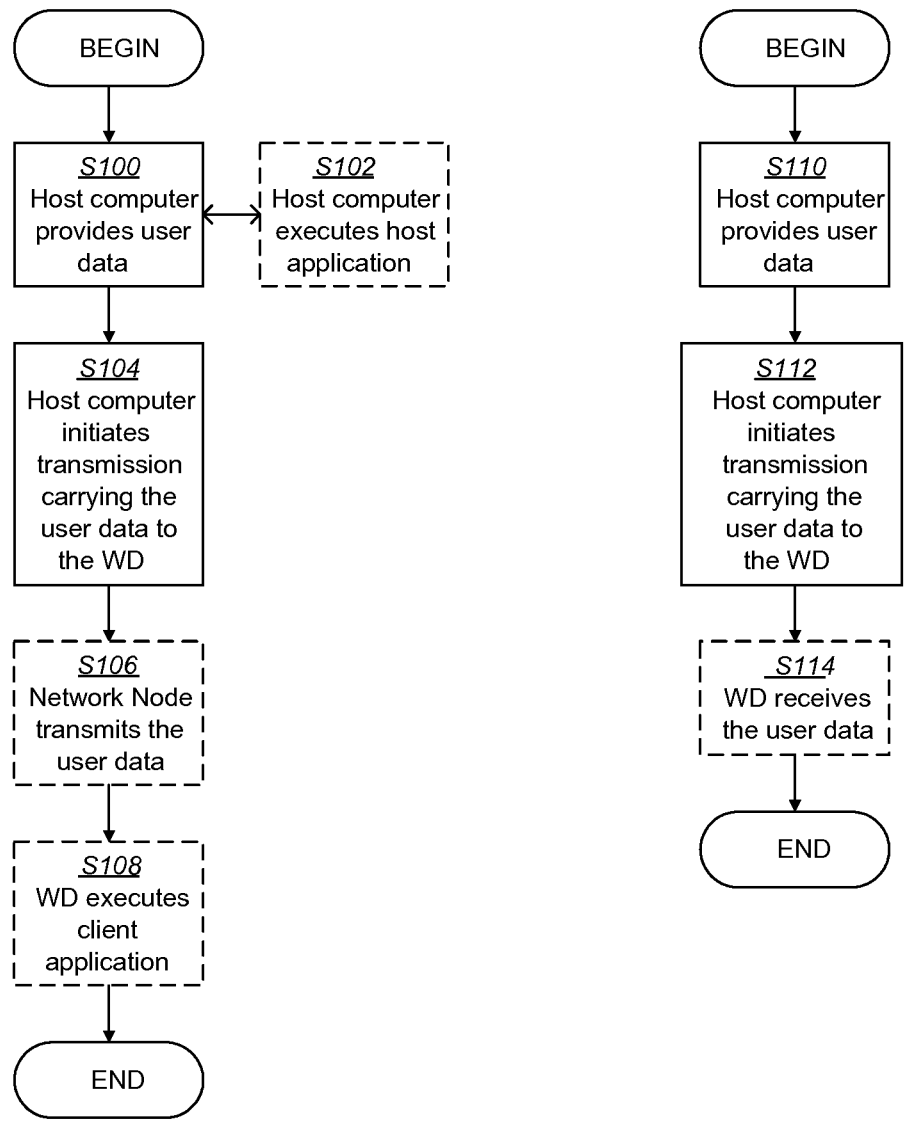

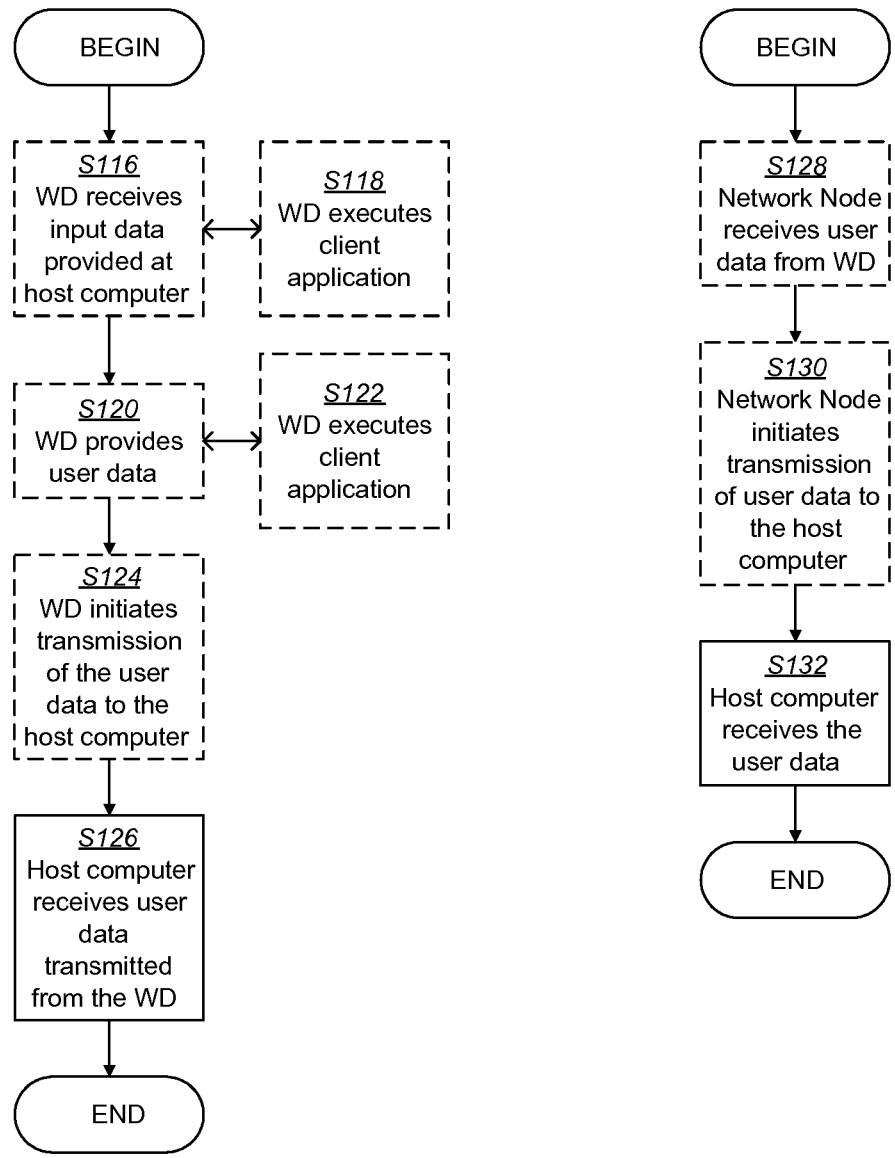

CONFIGURED GRANTS IN TIME DIVISION DUPLEX COMMUNICATIONS

CROSS-REFERENCE TO RELATED APPLICATIONS

This application is a Submission Under 35 U.S.C. § 371 for U.S. National Stage Patent Application of International Application No.: PCT/EP2019/050700, filed Jan. 11, 2019 entitled "CONFIGURED GRANTS IN TIME DIVISION DUPLEX COMMUNICATIONS," which claims priority to U.S. Provisional Application No. 62/616,679, filed Jan. 12, 2018, entitled "CONFIGURED GRANTS IN TIME DIVISION DUPLEX COMMUNICATIONS," the entireties of both of which are incorporated herein by reference.

TECHNICAL FIELD

The present disclosure relates to wireless communications, and in particular, to resolving conflicts between configured uplink transmission and dynamic downlink/uplink configurations in Time Division Duplex.

BACKGROUND

Data Transmission with Configured Grant

In cellular wireless systems, such as Long-Term Evolution (LTE) and New Radio (NR) standards in Third Generation Partnership Project (3GPP), resources for uplink (UL) transmissions are normally scheduled by the network node such as the enhanced NodeB (eNB) or the gNB.

In LTE, this scheduling can be done dynamically, i.e., the network node schedules the UL transmission, i.e., from the wireless device to the network node, per transmission occasion which can be a transmission time interval (TTI) or multiple TTIs (TTI bundling). Alternatively, this scheduling can be done using a semi persistent scheduling (SPS) framework, so that multiple periodic occasions are granted at the same time, i.e., prior to a data transmission. Configuration of SPS includes periodicity of the grant, allocation in time and frequency and modulation and coding scheme (MCS) in subsequent SPS occasions.

Compared to UL dynamic scheduling, SPS can access the UL transmission resources much more quickly, since SPS removes the steps of sending scheduling request at the wireless device and responding to an UL dynamic grant at the network node. SPS was enhanced in 3GPP Long Term Evolution release 14 (LTE-14) to support further latency reduction of UL data transmissions. One enhancement is that the periodicity is reduced to the minimum value, i.e., one TTI in LTE. Another enhancement is skipping UL transmission with empty buffer. In LTE Rel-13 and before Rel-1, if the buffer is empty, then the wireless device needs to send a padding on the allocated SPS resources. It is more likely that the wireless device might have empty data with such a low periodicity, and sending padding at every TTI introduces unnecessary interferences. Consequently, the option of skipping UL data transmissions when the buffer is empty is introduced. However, the configured resources are still reserved for the wireless device, which might lead to inefficient resource utilization.

In New Radio (NR), the principle of allocating periodic UL transmission resources in SPS is considered, and is discussed under the name "configured grant", "UL transmission without grant", "grant-free transmission", or "UL transmission without dynamic scheduling". Some further features compared to LTE SPS are added to support low latency and high reliability requirement.

Two types of UL configured grant have been specified. In configured grant type 1, resource configuration may only be based on RRC (re)configuration without any Layer (L1) signalling. Configured grant Type 2 is similar to LTE SPS, which is based on both RRC configuration and L1 signalling to activation/deactivation of the UL resources.

LTE TDD SPS Configuration

LTE SPS utilizes Frame structure type 2. Each radio frame of length 10 ms consists of two half-frames of length 5 ms each. Each half-frame consists of five subframes of length 1 ms. The supported uplink-downlink configurations are listed in Table 4.2-2 from 3GPP Technical Specification (TS) 36.211 (which is reproduced below), where, for each subframe in a radio frame, "D" denotes the subframe is reserved for downlink transmissions, "U" denotes the subframe is reserved for uplink transmissions and "S" denotes a special subframe with the three fields Downlink Pilot Time Slot (DwPTS), Guard Period (GP) and Uplink Pilot Time Slot (UpPTS). The length of a DwPTS and UpPTS is subject to the total length of DwPTS, GP and UpPTS being equal to 1 ms.

TABLE 4.2-2

Uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

3GPP TS 36.321 v8.12.0 states that, after a Semi-Persistent Scheduling uplink grant is configured, the UE should consider that "Nth" grant occurs when the System Frame Number "SFN" and "subframe" satisfies that:

$(10*SFN+subframe)=[(10*SFN_{start\ time}+subframe_{start\ time})+N*$ semiPersistSchedIntervalUL+Subframe_Offset*(N modulo 2)] modulo 10240, for all N>0, where $SFN_{start\ time}$ and $subframe_{start\ time}$ are the SFN and subframe, respectively, at the time the configured uplink grant were (re-)initialized. Subframe_Offset depends on the TDD UL/DL configuration and the position of the initial semi-persistent grant, see table 7.4.1 in 3GPP TS 36.3221 v8.12.0.

In TDD, the periodicity of semiPersistSchedIntervalUL is a multiple of 10 subframes. Since the uplink-downlink configuration in TDD repeats itself at least every 10 ms, whenever the above condition for the SPS grant is satisfied, the corresponding subframe is "U", i.e., it can be used for UL transmission. Note, the number of UL SPS process is one.

In LTE Rel-13, in order to support enhanced machine-type communication (eMTC) wireless devices for operating on UL SPS, a couple of enhancements are added. First, the number of the UL SPS Hybrid Automatic Repeat Request (HARQ) processes is a configurable number and can be larger than one. Second, the UL HARQ operation is "asynchronous", meaning that HARQ process identity (ID) can be different and is associated with the TTI. The HARQ Process ID is derived from the following equation for asynchronous UL HARQ operation:

HARQ Process ID=[floor(CURRENT_TTI/semiPersistSchedIntervalUL)]modulo numberOfConfUISPS-Processes, where CURRENT_TTI=[(SFN*10)+subframe number] and it refers to the subframe where the first transmission of a bundle takes place.

In LTE rel-14, semiPersistSchedIntervalUL can be configured to be smaller than 10 ms, such as 1 subframe, 2 subframes, 3 subframes, etc. Therefore, some of the UL SPS grants calculated according to the above formula may not be available because they are downlink subframes. 3GPP TS 36.321 v14.9.0 states, for TDD, if the Medium Access Control (MAC) entity is configured with semiPersistSchedIntervalUL shorter than 10 subframes, then the Nth grant may be ignored if it occurs in a downlink subframe or a special subframe.

SUMMARY

Some embodiments advantageously provide methods, systems, network nodes and wireless devices for resolving conflicts between configured uplink transmission and dynamic downlink/uplink configurations in Time Division Duplex. In one or more embodiments, a method for resolving conflicts between configured uplink transmission and dynamic downlink/uplink configurations in Time Division Duplex includes adapting the UL transmission time in the wireless device to the configured/indicated slot format, wherein one or more embodiments, the network node configures/indicates what the wireless device should do to resolve the conflict between configured uplink transmission and dynamic downlink/uplink configurations in Time Division Duplex.

According to one aspect of the disclosure, a network node for communication with a wireless device is provided. The wireless device is configured with a periodic uplink and downlink configuration. The network node includes processing circuitry configured to transmit, to the wireless device, an indication, of a scheduling of a first resource where the scheduling of the first resource is conflicting with a function of the first resource according to the periodic uplink and downlink configuration and the conflict causing the wireless device to perform at least one operation. The processing circuitry is further configured to receive a transmission from the wireless device on second resource that differs from the periodic uplink and downlink configuration and that is different from the first resource where the received transmission being based on the at least one operation.

According to one or more embodiments of this aspect, the indication corresponds to a slot format indicator, SFI, or dynamic signaling that is configured to change the function of the first resource: from an uplink resource to a downlink resource or from a downlink resource to an uplink resource. According to one or more embodiments of this aspect, the transmission of the second resource is configured to occur: before the first resource or after the first resource. According to one or more embodiments of this aspect, the periodic uplink and downlink configuration corresponds to an uplink and downlink pattern of resources having a predefined periodicity.

According to one or more embodiments of this aspect, the first resource corresponds to at least one symbol. According to one or more embodiments of this aspect, the second resource corresponds to at least one symbol and to a next available resource after the first resource. According to one or more embodiments of this aspect, the second resource occurs within a predefined time period that includes the first resource.

According to another aspect of the disclosure, a wireless device for communication with a network node is provided where the wireless device is configured with a periodic uplink and downlink configuration. The wireless device includes processing circuitry configured to: receive an indication of a scheduling of a first resource, determine that the scheduling conflicts with a function of the first resource according to the periodic uplink and downlink configuration, and transmit on a second resource that differs from the periodic uplink and downlink configuration and that is different from the first resource where the transmission is based on the determination of the conflict.

According to one or more embodiments of this aspect, the indication corresponds to a slot format indicator, SFI, or dynamic indication that is configured to change the function of the first resource: from an uplink resource to a downlink resource or from a downlink resource to an uplink resource. According to one or more embodiments of this aspect, the transmission of the second resource is configured to occur: before the first resource or after the first resource.

According to one or more embodiments of this aspect, the second resource occurs within a predefined time period that includes the first resource. According to one or more embodiments of this aspect, the periodic uplink and downlink configuration corresponds to an uplink and downlink pattern of resources having a predefined periodicity. According to one or more embodiments of this aspect, the first resource corresponds to at least one symbol. According to one or more embodiments of this aspect, the second resource corresponds to at least one symbol and to a next available resource after the first resource.

According to another aspect of the disclosure, a method for a network node for communication with a wireless device is provided where the wireless device configured with a periodic uplink and downlink configuration. An indication is transmitted, to the wireless device, of a scheduling of a first resource, the scheduling of the first resource conflicting with a function of the first resource according to the periodic uplink and downlink configuration where the conflict causes the wireless device to perform at least one operation. A transmission is received from the wireless device on a second resource that differs from the periodic uplink and downlink configuration and that is different from the first resource where the received transmission is based on the at least one operation.

According to one or more embodiments of this aspect, the indication corresponds to a slot format indicator, SFI, or dynamic signaling that is configured to change the function of the first resource: from an uplink resource to a downlink resource or from a downlink resource to an uplink resource. According to one or more embodiments of this aspect, the transmission of the second resource is configured to occur: before the first resource or after the first resource. According to one or more embodiments of this aspect, the periodic uplink and downlink configuration corresponds to an uplink and downlink pattern of resources having a predefined periodicity.

According to one or more embodiments of this aspect, the first resource corresponds to at least one symbol. According to one or more embodiments of this aspect, the second resource corresponds to at least one symbol and to a next available resource after the first resource. According to one or more embodiments of this aspect, the second resource occurs within a predefined time period that includes the first resource.

According to another aspect of the disclosure, a method for a wireless device for communication with a network node is provided where the wireless device is configured with a periodic uplink and downlink configuration. An indication of a scheduling of a first resource is received. A determination is made that the scheduling conflicts with a function of the first resource according to the periodic uplink and downlink configuration. Transmission is performed on a second resource that differs from the periodic uplink and downlink configuration and that is different from the first resource, the transmission being based on the determination of the conflict.

According to one or more embodiments of this aspect, the indication corresponds to a slot format indicator, SFI, or dynamic signaling that is configured to change the function of the first resource: from an uplink resource to a downlink resource or from a downlink resource to an uplink resource. According to one or more embodiments of this aspect, the transmission of the second resource is configured to occur: before the first resource or after the first resource. According to one or more embodiments of this aspect, the second resource occurs within a predefined time period that includes the first resource.

According to one or more embodiments of this aspect, the periodic uplink and downlink configuration corresponds to an uplink and downlink pattern of resources having a predefined periodicity. According to one or more embodiments of this aspect, the first resource corresponds to at least one symbol. According to one or more embodiments of this aspect, the second resource corresponds to at least one symbol and to a next available resource after the first resource.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for executing a client application at a wireless device according to some embodiments of the present disclosure;

FIG. 7 is a flowchart illustrating exemplary methods implemented in a communication system including a host computer, a network node and a wireless device for receiving user data at a wireless device according to some embodiments of the present disclosure;

FIG. 8 is a flowchart illustrating exemplary methods implemented in a communication system including a host computer, a network node and a wireless device for receiving user data from the wireless device at a host computer according to some embodiments of the present disclosure;

FIG. 9 is a flowchart illustrating exemplary methods implemented in a communication system including a host computer, a network node and a wireless device for receiving user data at a host computer according to some embodiments of the present disclosure;

DETAILED DESCRIPTION

TDD in NR

Figure 1:
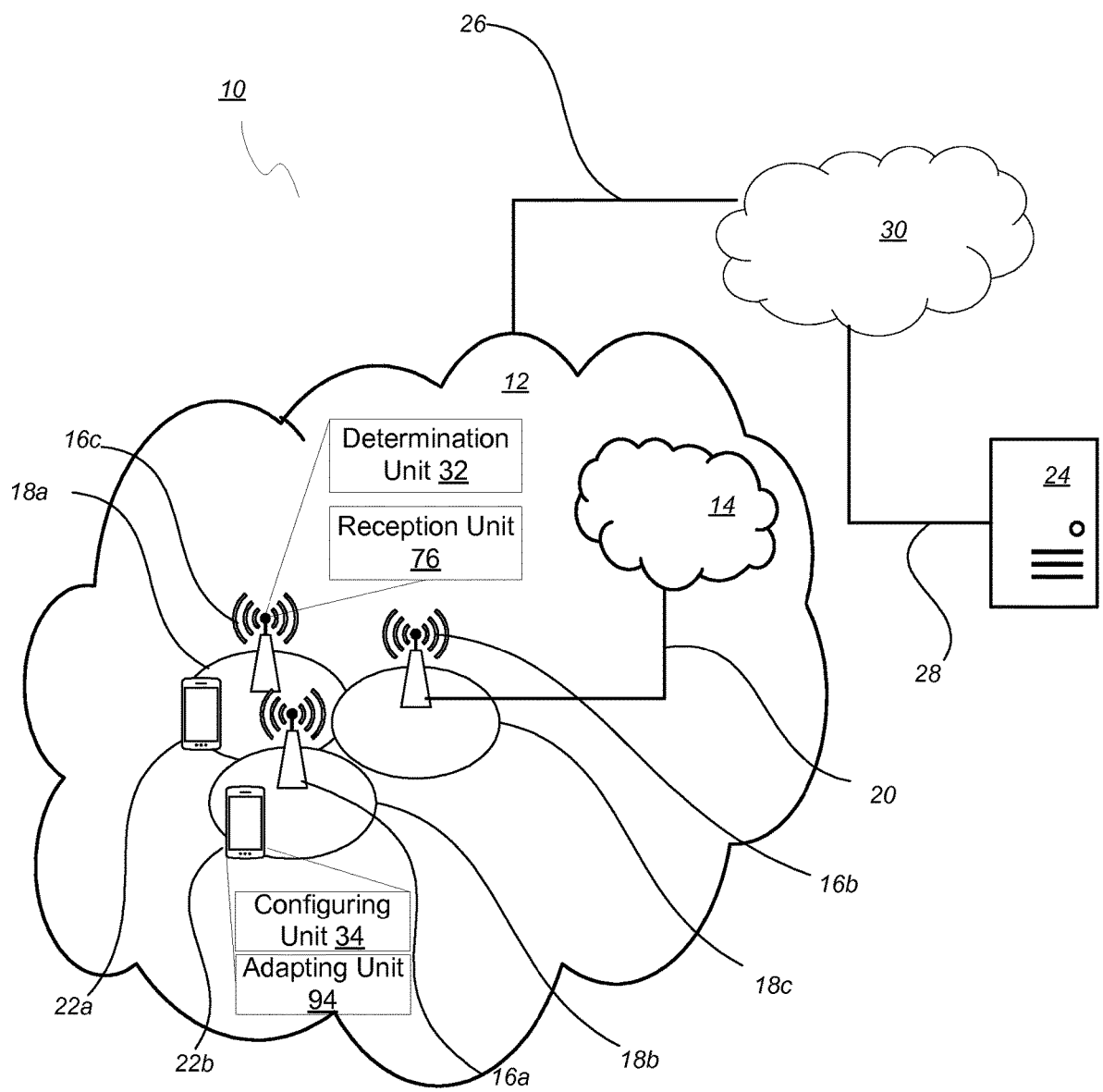
FIG. 1 is a schematic diagram of an exemplary network architecture illustrating a communication system connected via an intermediate network to a host computer according to the principles in the present disclosure.

3GPP NR provides more flexibility in terms of uplink/downlink (UL/DL) configurations in time division duplex (TDD). Unlike LTE, where UL/DL configuration can only be one of seven different DL/UL subframe configurations, NR supports different configurations on slot level or can even specify DL/UL on a symbol level. Also, the number of possible configurations is a lot more than that of LTE.

In NR, TDD and FDD configurations are referred to as slot format. Slot format can be configured by RRC configurations or indicated by a group common control channel, i.e. dynamic slot format indicator (SFI). In a Radio Resource Control (RRC) configured case, the slot format can be either configured for the whole cell (common UL/DL configuration) with a configurable periodicity, or configured to a single wireless device (dedicated UL/DL configuration). In dynamic SFI, multiple slot formats can be configured for a wireless device, and by dynamic signaling one or several of the preconfigured ones is indicated to be used by the wireless device.

Further, in 3GPP NR, when an UL transmission with configured grant is used, the wireless device is expected to perform UL transmissions at certain periodic time instances. However, it is not defined what the wireless device should do when, in TDD configurations, the expected time instance such as in a slot format is for DL transmission. The instant disclosure solves at least one problem with existing systems, in NR TDD, by, in one or more embodiments, adapting the UL transmission time in the wireless device in a configured grant to the configured/indicated slot format, thereby advantageously avoiding confusion between network node and wireless device, and allowing the wireless device to transmit UL data where a corresponding resource in a slot format assignment is a DL transmission resource. Confusion between network node and wireless device may exist, for example, in that a configured grant may indicate for the wireless device to transmit on the UL on one or more resources, but the slot format indicates the wireless device is to receive a downlink transmission on the one or more resources. Therefore, the wireless device may not know which function to perform, if any.

Before describing in detail exemplary embodiments, it is noted that the embodiments reside primarily in combinations of apparatus components and processing steps related to resolving conflicts between configured uplink transmission and dynamic downlink/uplink configurations in Time Division Duplex where a conflict occurs, for example, when a resource is mapped to conflicting configurations for transmission such as mapped to a downlink configuration and also mapped to an uplink configuration. One or more advantages of the method/processes described herein include: that the described arrangements avoid confusion between network node and wireless device, and allow the wireless device to transmit UL data when a slot format assigns the corresponding resource as a DL transmission, i.e., allow the wireless device to transmit UL data when there is a conflict.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

In some embodiments, a "function" of one or more resources may refer to a mapping of a resource configuration to a transmission. For example, one or more resources may be configured for an uplink transmission function where the uplink transmission function corresponds to a mapping of a resource configuration to an uplink transmission. A conflict may occur, for example, when different mappings of resources configurations are configured to be applied to the same one or more resources. In another example, the uplink configuration corresponds to uplink transmission and downlink configuration corresponds to downlink transmission. In another example, one or more special frames may be considered where the one or more special frames correspond to a transition from the uplink to downlink and vice versa.

In some embodiments, one or more "operations" may correspond to one or more actions and/or processes performed by the wireless device such as in response to a conflict and/or to resolve the conflict, as described herein.

The term resource (e.g., first resource and/or second resource such as an uplink resource and/or downlink resource, etc.) used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc. In one or more embodiments, a resource may be of any length but may be as short as one symbol.

Signaling may comprise transmission and/or reception of one or more signals and/or symbols. Signaling may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

An indication (e.g., indication of a scheduling of a resource, slot format indicator that changes a function of a resource) generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information and/or scheduling information.

Transmitting in downlink on one or more downlink resources may pertain to transmission from the network or network node to the terminal. Transmitting in uplink on one or more uplink resources may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for resolving conflicts between a function of one or more resources where the function may correspond to configurations mapped to one or more resources such as configured uplink transmission and dynamic downlink/uplink configurations in Time Division Duplex communications. Returning to the drawing figures, in which like elements are referred to by like reference numerals, there is shown in FIG. 1 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

In one or more embodiments, a network node 16 is configured to include a determination unit 32 which is configured to determine a configured grant, the configured grant indicating an uplink (UL) transmission time for a wireless device, transmit the configured grant to the wireless device, determine information for adapting the UL transmission time based on a slot format, the adapted UL transmission time being different from the indicated UL transmission time in the configured grant, and transmit the information to the wireless device, as discussed herein. In one or more embodiments, a network node 16 is configured to include a reception unit 76 which is configured to receive UL transmissions from wireless device 22 based on an adapted UL transmission time as described herein. In one or more embodiments, a wireless device 22 is configured to include a configuring unit 34 which is configured to cause wireless device 22 to receive a configured grant with an UL transmission time and configure/adapt the UL transmission time as described herein. In one or more embodiments, a wireless device 22 is configured to include an adapting unit 94 which is configured to cause the wireless device 22 to configure/adapt an UL transmission time as described herein.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include determination unit 32 configured to transmit a configured grant indicating an uplink (UL) transmission time for a WD 22, as described herein. In one or more embodiments, determination unit 32 is configured to transmit a network configuration configured to cause a wireless device to skip a transmission on an UL symbol within a configured period. The processing circuitry 68 may also include reception unit 76 configured to receive uplink (UL) transmission based on an UL transmission time that has been adapted based on a slot format, the adapted UL transmission time being different from an UL transmission time indicated in a configured grant, as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a configuring unit 34 configured to receive a configured grant indicating an uplink (UL) transmission time for a wireless device, and adapt the UL transmission time based on an indicated slot format, the adapted UL transmission time being different from the indicated UL transmission time, as described herein. The processing circuitry 84 may also include adapting unit 94 configured to adapt an UL transmission time based on an indicated slot format, the adapted UL transmission time being different from an UL transmission time indicated in a configured grant, as described herein.

Figure 2:
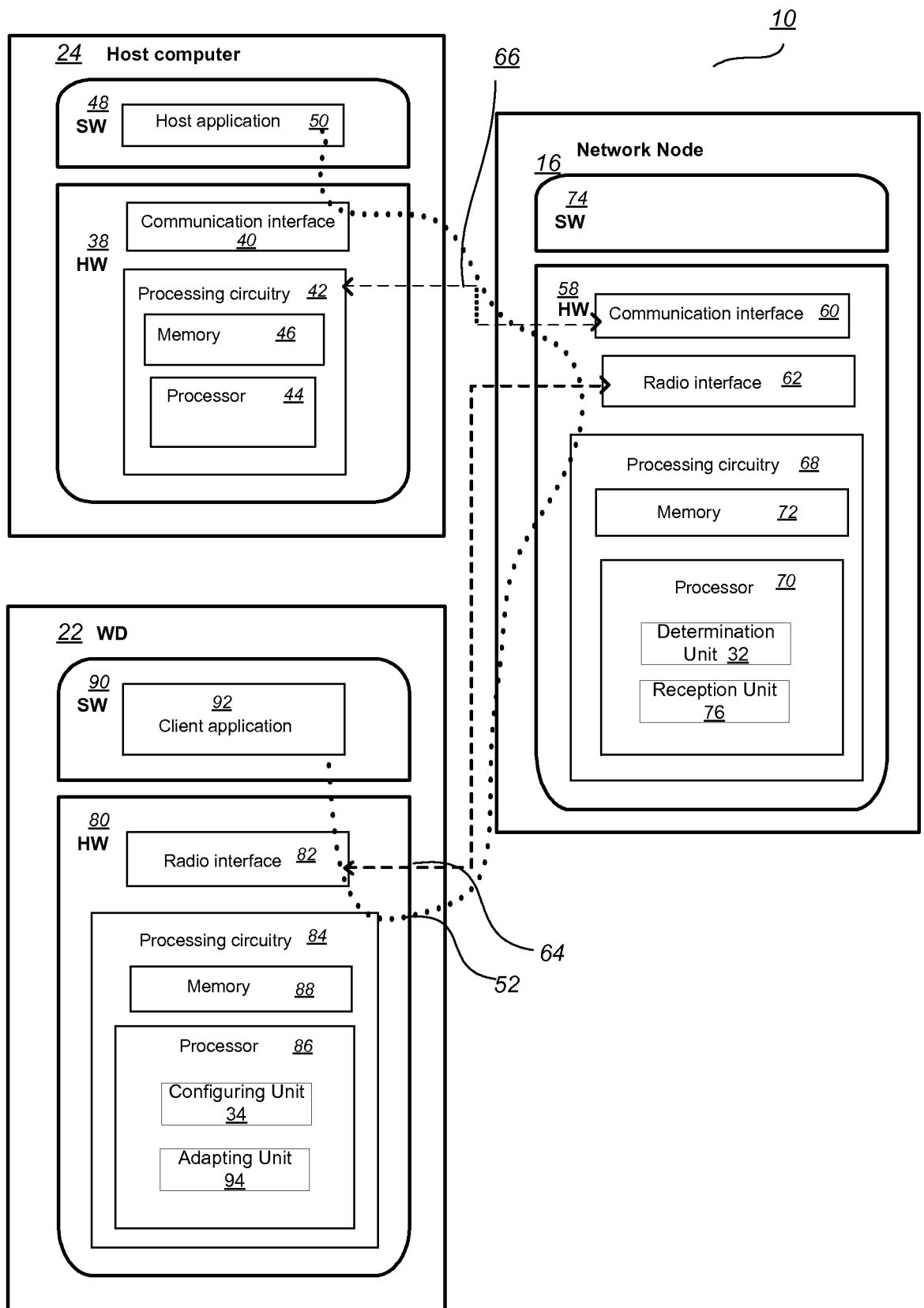
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the WD 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Although FIGS. 1 and 2 show various "units" such as determination unit 32, configuring unit 34, reception unit 76 and adapting unit 94 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
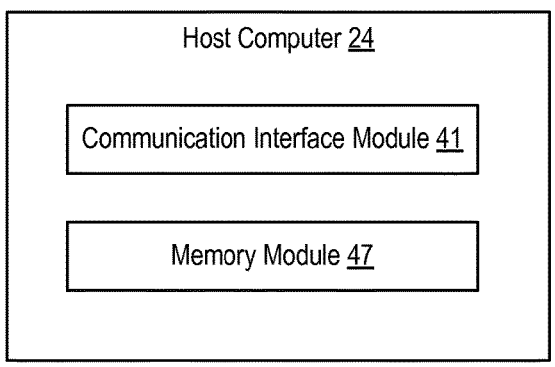
FIG. 3 is a block diagram of an alternative embodiment of a host computer according to some embodiments of the present disclosure.

FIG. 3 is a block diagram of an alternative host computer 24, which may be implemented at least in part by software modules containing software executable by a processor to perform the functions described herein. The host computer 24 includes a communication interface module 41 configured to set up and maintain a wired or wireless connection with an interface of a different communication device of the communication system 10. The memory module 47 is configured to store data, programmatic software code and/or other information described herein.

Figure 4:
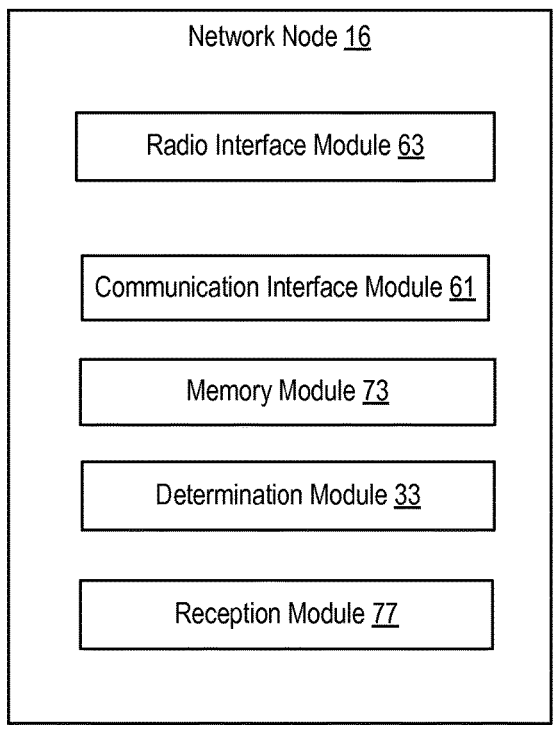
FIG. 4 is a block diagram of an alternative embodiment of a network node according to some embodiments of the present disclosure.

FIG. 4 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The determination module 33 is configured to determine a configured grant, the configured grant indicating an uplink (UL) transmission time for a wireless device, transmit the configured grant to the wireless device, determine information for adapting the UL transmission time based on a slot format, the adapted UL transmission time being different from the indicated UL transmission time in the configured grant, and transmit the information to the wireless device, as described herein. The reception module 77 is configured to receive uplink (UL) transmission based on an UL transmission time that has been adapted based on a slot format, the adapted UL transmission time being different from an UL transmission time indicated in a configured grant, as described herein.

Figure 5:
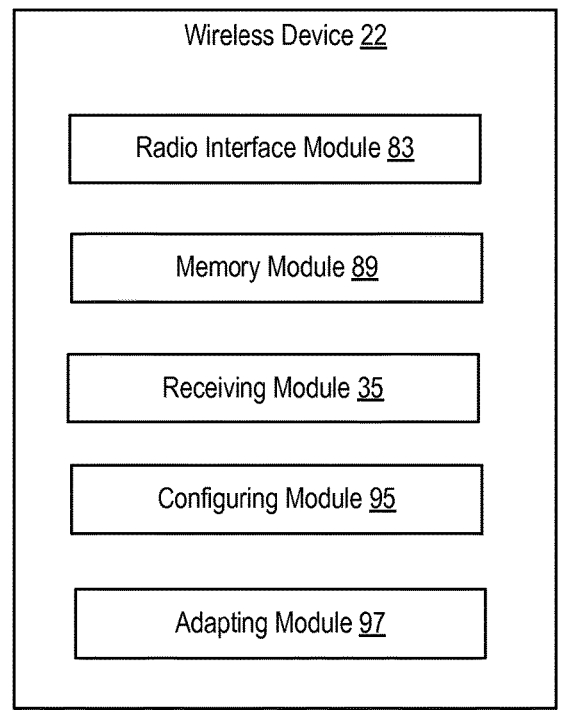
FIG. 5 is a block diagram of an alternative embodiment of a wireless device according to some embodiments of the present disclosure.

FIG. 5 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The receiving module 35 is configured to receive a configured grant indicating an uplink (UL) transmission time for a wireless device, as described herein. The configuring module 95 is configured to adapt the UL transmission time based on an indicated slot format, the adapted UL transmission time being different from the indicated UL transmission time, as described herein. The adapting module 97 is configured to adapt an UL transmission time based on an indicated slot format, the adapted UL transmission time being different from an UL transmission time indicated in a configured grant.

FIG. 6 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides (Block S100) user data. In an optional substep of the first step, the host computer 24 provides (Block S102) the user data by executing a host application, such as, for example, the host application 50. In a second step, the host computer 24 initiates (Block S104) a transmission carrying the user data to the WD 22. In an optional third step, the network node 16 transmits (Block S106) to the WD 22 the user data which was carried in the transmission that the host computer 24 initiated, in accordance with the teachings of the embodiments described throughout this disclosure. In an optional fourth step, the WD 22 executes (Block S108) a client application, such as, for example, the client application 114, associated with the host application 50 executed by the host computer 24.

FIG. 7 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides (Block S110) user data. In an optional substep (not shown) the host computer 24 provides the user data by executing a host application, such as, for example, the host application 50. In a second step, the host computer 24 initiates (Block S112) a transmission carrying the user data to the WD 22. The transmission may pass via the network node 16, in accordance with the teachings of the embodiments described throughout this disclosure. In an optional third step, the WD 22 receives (Block S114) the user data carried in the transmission.

FIG. 8 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives (Block S116) input data provided by the host computer 24. In an optional substep of the first step, the WD 22 executes the client application 114, which provides the user data in reaction to the received input data provided by the host computer 24 (Block S118). Additionally or alternatively, in an optional second step, the WD 22 provides (Block S120) user data. In an optional substep of the second step, the WD provides (Block S122) the user data by executing a client application, such as, for example, client application 114. In providing the user data, the executed client application 114 may further consider user input received from the user. Regardless of the specific manner in which the user data was provided, the WD 22 may initiate (Block S124), in an optional third substep, transmission of the user data to the host computer 24. In a fourth step of the method, the host computer 24 receives (Block S126) the user data transmitted from the WD 22, in accordance with the teachings of the embodiments described throughout this disclosure.

FIG. 9 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives (Block S128) user data from the WD 22. In an optional second step, the network node 16 initiates (Block S130) transmission of the received user data to the host computer 24. In a third step, the host computer 24 receives (Block S132) the user data carried in the transmission initiated by the network node 16.

Figure 10:
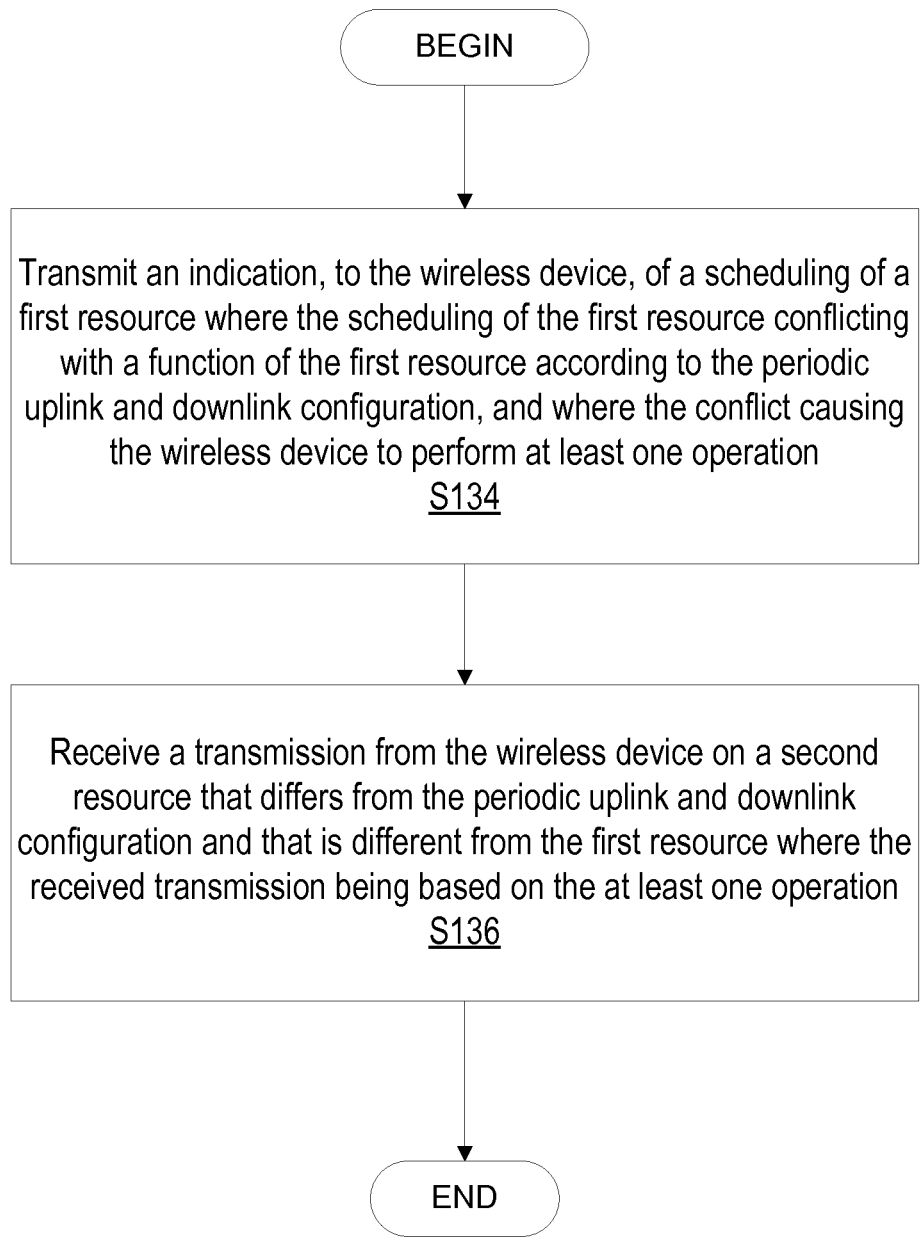
FIG. 10 is a flowchart of an exemplary process in a network node according to some embodiments of the present disclosure.

FIG. 10 is a flowchart of an exemplary process in a network node 16 in accordance with teachings of the disclosure. Generally, with respect to one or more Blocks performed by network node 16 as described herein, the one or more Blocks performed by network node 16 may be performed by one or more elements of network node 16 such as by determination unit 32 and/or reception unit 76 in processing circuitry 68, processor 70, communication interface 60, radio interface 62, etc. In one or more embodiments, network node 16 such as via one or more of processing circuitry 68, processor 70 radio interface 62 and communication interface 60 is configured to transmit (Block S134) an indication, to the wireless device 22, of a scheduling of a first resource where the scheduling of the first resource conflicting with a function of the first resource according to the periodic uplink and downlink configuration and where the conflict configured to cause the wireless device 22 to perform at least one operation.

In one or more embodiments, network node 16 such as via one or more of processing circuitry 68, processor 70 radio interface 62 and communication interface 60 is configured to receive (Block S136) a transmission from the wireless device 22 on a second resource that differs from the periodic uplink and downlink configuration and that is different from the first resource, the received transmission being based on the at least one operation.

According to one or more embodiments, the indication corresponds to a slot format indicator, SFI, or dynamic signaling (e.g., DL assignment, UL grant, etc.) that is configured to change the function of the first resource of one selected from a group of consisting of: from an uplink resource to a downlink resource; and from a downlink resource to an uplink resource. In one or more embodiments, the SFI is a dynamic SFI. According to one or more embodiments, the transmission of the second resource is configured to occur at one selected from a group consisting of: before the first resource; and after the first resource. According to one or more embodiments, the periodic uplink and downlink configuration corresponds to an uplink and downlink pattern of resources having a predefined periodicity.

According to one or more embodiments, the first resource corresponds to at least one symbol. According to one or more embodiments of this aspect, the second resource corresponds to a next available resource after the first resource. According to one or more embodiments, the second resource occurs within a predefined time period that includes the second resource.

Figure 11:
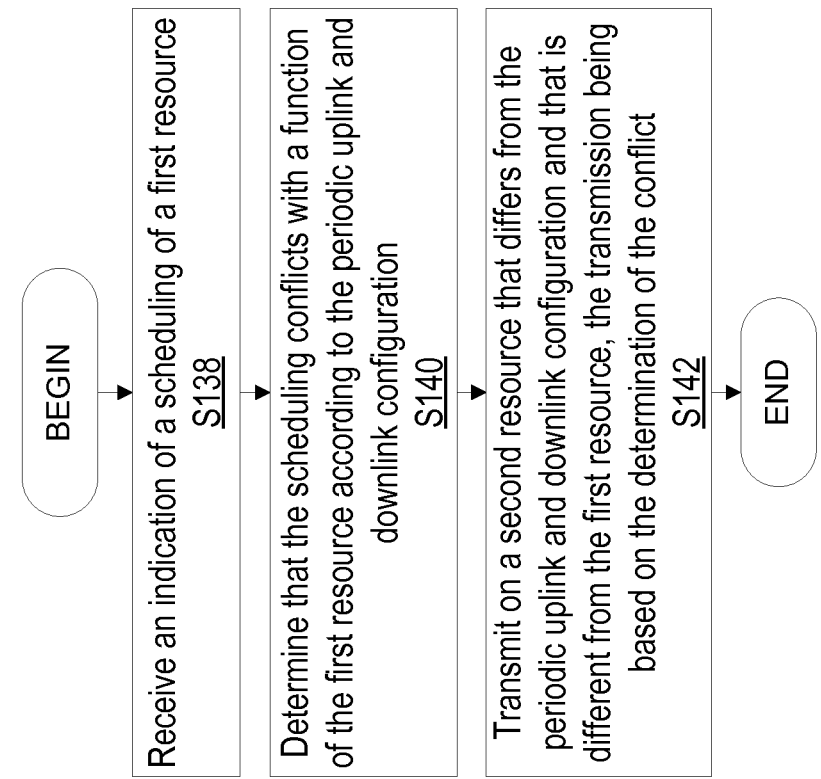
FIG. 11 is a flowchart of an exemplary process in a wireless device according to some embodiments of the present disclosure.

FIG. 11 is a flowchart of an exemplary process in a wireless device 22 in accordance with teachings of the disclosure. Generally, with respect to one or more Blocks performed by wireless device 22 as described herein, the one or more Blocks performed by wireless device 22 may be performed by one or more elements of wireless device 22 such as by configuring unit 34 and/or adapting unit 94 in processing circuitry 84, processor 86, radio interface 82, etc. In one or more embodiments, wireless device 22 such as via one or more of processing circuitry 84, processor 86, radio interface 82 is configured to receive (Block S138) an indication of a scheduling of a first resource. In one or more embodiments, wireless device 22 such as via one or more of processing circuitry 84, processor 86, radio interface 82 is configured to determine (Block S140) that the scheduling conflicts with a function of the first resource according to the periodic uplink and downlink configuration. In one or more embodiments, wireless device 22 such as via one or more of processing circuitry 84, processor 86, radio interface 82 is configured to transmit (Block S142) on a second resource that differs from the periodic uplink and downlink configuration and that is different from the first resource, the transmission being based on the determination of the conflict.

According to one or more embodiments of this aspect, the indication corresponds to a slot format indicator, SFI, or dynamic signaling (e.g., DL assignment, UL grant, etc.) that is configured to change the function of the first resource of one selected from a group of consisting of: from an uplink resource to a downlink resource; and from a downlink resource to an uplink resource. In one or more embodiments, the SFI is a dynamic SFI. According to one or more embodiments of this aspect, the transmission of the second resource is configured to occur at one selected from a group consisting of: before the first resource; and after the first resource.

According to one or more embodiments of this aspect, the second resource occurs within a predefined time period that includes the second resource. According to one or more embodiments of this aspect, the periodic uplink and downlink configuration corresponds to an uplink and downlink pattern of resources having a predefined periodicity. According to one or more embodiments of this aspect, the first resource corresponds to at least one symbol. According to one or more embodiments of this aspect, the second resource corresponds to a next available resource after the first resource. According to one or more embodiments of this aspect, the second resource occurs within a predefined time period that includes the second resource.

Figure 12:
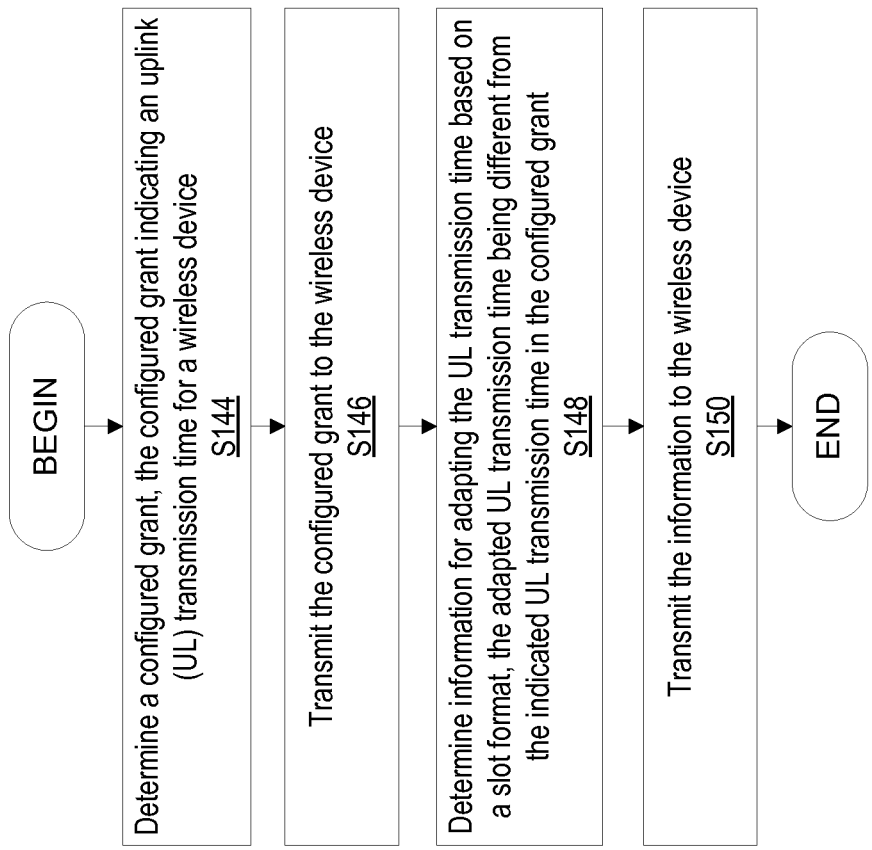
FIG. 12 is a flowchart of another exemplary process in a network node according to some embodiments of the present disclosure.

FIG. 12 is a flowchart of another exemplary process in a network node 16 in accordance with the principles of the disclosure where the process may be applied, for example, for configuring WD 22 to resolve conflicts by, for example, adapting the UL transmission time, as described herein. Processing circuitry 68 is configured to determine (Block S144) a configured grant where the configured grant indicates an uplink (UL) transmission time for a wireless device, as described herein. Processing circuitry 68 is configured to transmit (Block S146) the configured grant to the WD 22, as described herein. Processing circuitry 68 is configured to determine (Block S148) information for adapting the UL transmission time based on a slot format where the adapted UL transmission time is different from the indicated UL transmission time in the configured grant, as described herein. For example, the information may include conditions and actions, i.e., one or more operations, the WD 22 is to perform such as skipping the transmission or other action, as described herein. Processing circuitry 68 is configured to transmit (Block S150) the information to the WD 22, as described herein. Therefore, in one or more embodiments, network node 16 configures WD 22 to resolve conflicts such as by, for example, performing one or more operations. Of note, although FIG. 12 shows a particular order of steps, it is contemplated that the determinations of Blocks S144 and S148 can be performed and then the transmissions of Blocks S146 and S150 can be made. In other words, the process of FIG. 12 is not limited to the order of the Blocks in FIG. 12. Similarly, processes are not limited to the specific order of steps shown in the other flowcharts of the disclosure. In some embodiments, the conflict resolution conditions and actions may be included in the initial configured grant.

Figure 13:
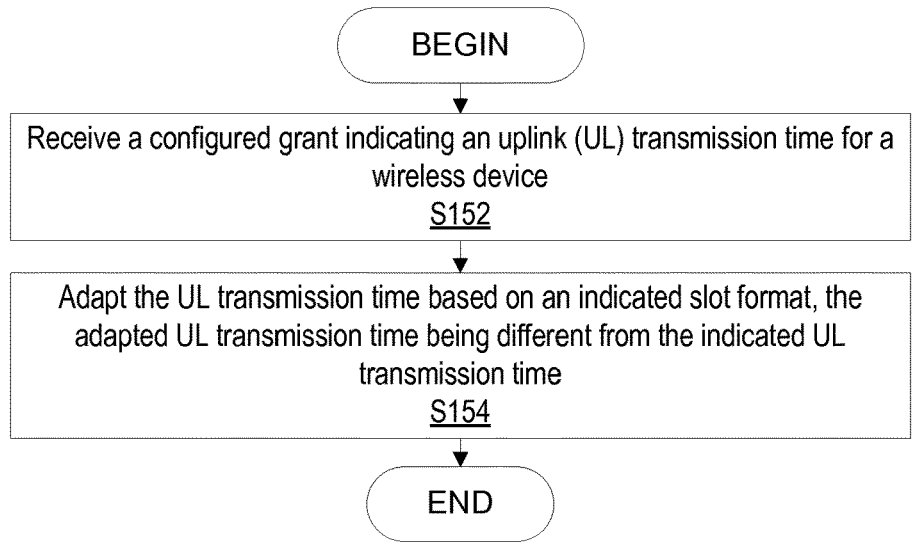
FIG. 13 is a flowchart of another exemplary process in a wireless device according to some embodiments of the present disclosure.

FIG. 13 is a flowchart of an exemplary process in a wireless device 22 in accordance with the principles of the disclosure where the process may be applied, for example, for resolving conflicts between configured uplink transmission and dynamic downlink/uplink configurations in Time Division Duplex, in one or more embodiments, by adapting an UL transmission time as described herein. In other words, adapting the UL transmission time as described herein resolves the conflict. Processing circuitry 84 is configured to receive (Block S152) a configured grant indicating an uplink (UL) transmission time for a wireless device. Processing circuitry 84 is further configured to adapt (Block S154) the UL transmission time based on an indicated slot format, the adapted UL transmission time being different from the indicated UL transmission time.

Figure 14:
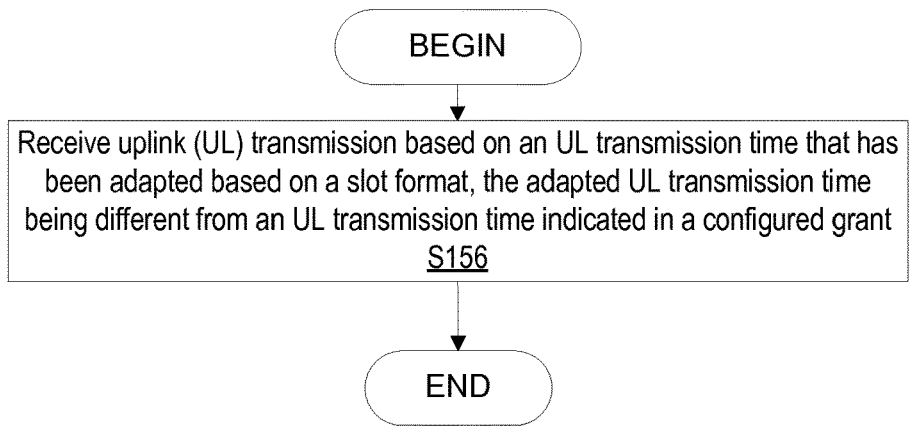
FIG. 14 is a flowchart of another exemplary process in a network node according to some embodiments of the present disclosure.

FIG. 14 is a flowchart of another exemplary process in a network node 16 according to some embodiments of the present disclosure. Processing circuitry 68 is configured to receive (Block S156) uplink (UL) transmission based on an UL transmission time that has been adapted based on a slot format, where the adapted UL transmission time is different from an UL transmission time indicated in a configured grant, as described herein.

Figure 15:
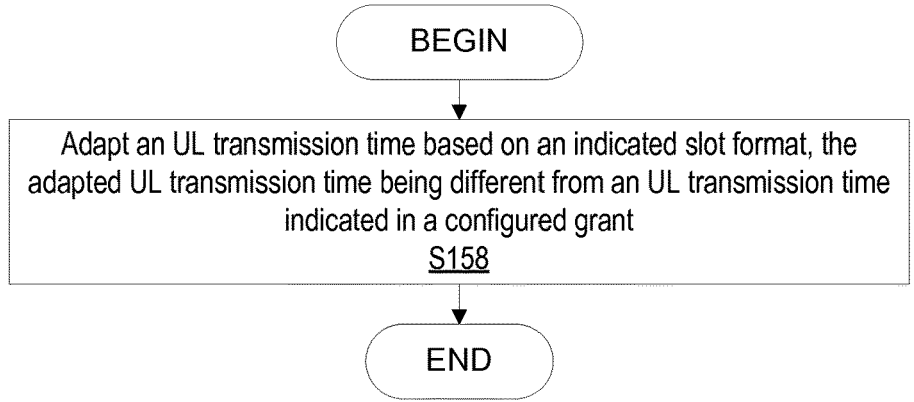
FIG. 15 is a flowchart of another exemplary process in a wireless device according to some embodiments of the present disclosure.

FIG. 15 is a flowchart of another exemplary process in a wireless device 22 according to some embodiments of the present disclosure. Processing circuitry 84 is configured to adapt (Block S158) an UL transmission time based on an indicated slot format, the adapted UL transmission time being different from an UL transmission time indicated in a configured grant, as described herein. The adapting of the UL transmission time being one example of an operation performed by wireless device 22.

One or more embodiments provide one or more methods, which may include one or more wireless device 22 operations, for resolving conflicts between configured uplink transmission and dynamic downlink/uplink configurations in Time Division Duplex, i.e., for resolving conflicts with a function of one or more resources where the function may correspond to a mapping of a configuration to transmission of one or more resources. These one or more embodiments are further described below in detail. As used herein, "slot" indicates the shortest UL transmission resources (e.g., "slot" can be one symbol) that can be indicated by NR.

Method of adapting WD 22 transmission time to or based on the slot format

According to one or more embodiments, the UL transmission time on a resource in a configured grant is adapted to the configured/indicated slot format.

In a configured grant (e.g., indication) from network node 16, a periodicity of transmission and an offset is configured/indicated to the WD 22 for UL transmission. But the slot format may change dynamically so in an upcoming symbol, a supposed UL symbol becomes a DL symbol (i.e., sched-uled function of resource is changed). In this case either one of the following methods, which may include one or more operations performed by the wireless device 22, can be used according to the conditions:

1. The WD 22 skips the transmission at the occasion (e.g., symbol, first resource), and uses the next available UL symbol (e.g., second resource) within the configured period, i.e., the offset is changed for current period of configured transmission. Skipping the transmission and/or using the next available UL symbol may be examples of one or more WD 22 operations. Some further embodiments are:

1a. WD 22 may be configured to use only the next available UL symbol (e.g., second resource) within a time window or after a time window. The time window may be configured by the network or set to a fixed value.

2. WD 22 skips that transmission within this configured period. This can happen by default through either of the following conditions:

2a. if there is no available UL symbol within that period;
    2b. by a network configuration;
    2c. period is shorter than a configurable value; and
    2d. For some patterns from a set of specified UL/DL patterns.

3. WD 22 skips the transmission at the occasion (e.g., symbol, first resource), and WD 22 uses the closest nearby UL symbol (e.g., second resource) within the configured period such that WD 22 can use the UL symbol that is earlier than the offset by the configured grant configuration. In one or more examples, the closest nearby UL symbol may be determined in the UL/DL configuration/pattern that is indicated by the SFI, dynamic SFI and/or dynamic signaling. This can be used in cases/conditions such as:

3a. UL/DL pattern is semi-statically configured such as by SFI, dynamic SFI and/or dynamic signaling (e.g., DL assignment, UL grant), but there is a mismatch between the pattern and the periodicity.

3b. A time window is defined, and if there is no UL symbol within the time window, then WD 22 skips the transmission.

If any of the conditions listed above is not satisfied, such as 1a, 2a, 2c and/or 3c, etc., the method/embodiment/action may not be triggered. If the condition for one method/embodiment is not satisfied, then the other methods can be tested with their corresponding triggering conditions. In one or more embodiments, configuration of these conditions and actions/methods (i.e., one or more operations such as skipping and/or using an UL symbol are performed by the WD 22) may be provided to the WD 22 by network node 16 or another entity in system 10 via information transmitted to the WD 22, as described herein. In one or more embodiments, time period is a time window, and vice versa.

If there is a repetition configured, for each transmission opportunity, any of the above methods/embodiments can be applied.

If the next available UL symbol (e.g., second resource) or closest nearby UL symbol (e.g., second resource) is to be used as described above, the next available UL symbol or the closest nearby UL symbol is set to:

1. The configured UL/DL pattern in which the "UL" symbol within one slot according to the WD 22 specific RRC configuration. In one or more embodiments, the configured UL/DL pattern is indicated by dynamic SFI and/or dynamic signaling.

2. or, the configured UL/DL pattern in which the "UL" symbol not within the current slot according to the WD 22 specific RRC configuration. In one or more embodiments, the configured UL/DL pattern is indicated by dynamic SFI and/or dynamic signaling.

3. or, explicitly signaled/indicated in the SFI that signals the change of UL→DL, where the UL symbol occurs after the reception of the SFI (e.g., indication) at the WD 22.

Figure 16:
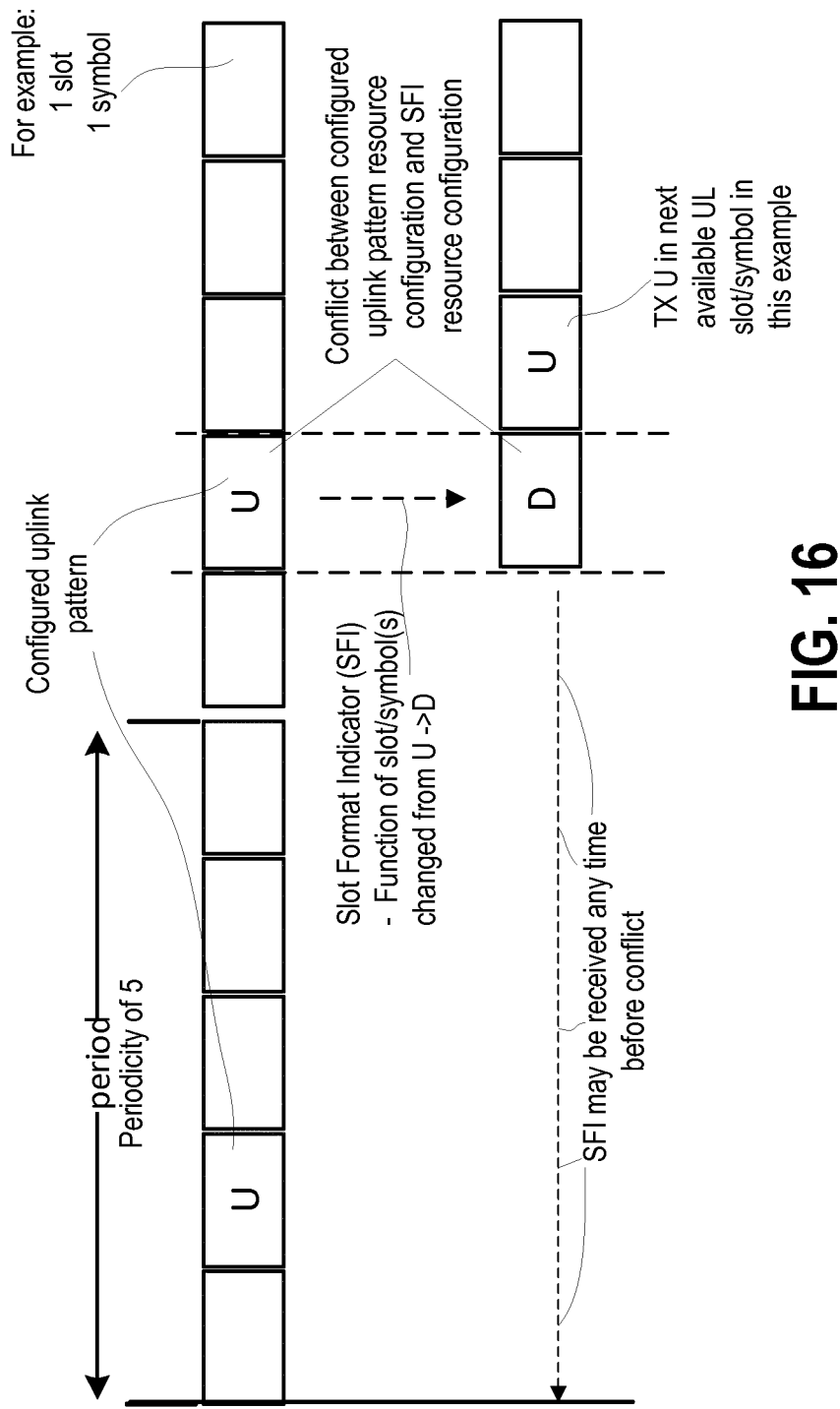
FIG. 16 is a block diagram of an example of adapting uplink transmission according to some embodiments of the present disclosure.

FIG. 16 is a block diagram of an example of adapting UL transmission according to some embodiments of the present disclosure. For example, FIG. 16 illustrates a situation where the time period is equal to 5 and the offset if equal to 0, counted from 0, and the offset of the second transmission is changed to two. In the example illustrated in FIG. 16, the SFI (e.g., indication) is received before the conflict where uplink transmission is changed to occur in the next available slot/symbol (e.g., second resource). In one or more examples, the uplink transmission may be changed to occur any time after the SFI is received by the wireless device 22 and the wireless device 22 determines a conflict with resource configuration exist. For example, the uplink transmission may be changed/modified to occur before the conflict. In other words, instead of skipping uplink transmission due to the conflict, the wireless device 22 is still able to perform the uplink transmission but in a different slot/symbol (e.g., in a second resource different from the first resource). In one or more embodiments, the conflict refers to a conflict between a configured uplink and/or downlink pattern resource configuration and a resource configuration indicated by the SFI, dynamic SFI and/or dynamic signaling. In one or more examples, a function of a resource in a first UL/DL configuration/pattern is changed based on a newly indicated UL/DL configuration/pattern as generally illustrated in FIG. 16, where the newly indicated UL/DL configuration pattern can be indicated by SFI, dynamic SFI and/or dynamic signaling. In one or more embodiments, this indication is configured to adapt the uplink transmission time as described herein.

Some Examples

Example A1. A network node 16 configured to communicate with a wireless device 22 (WD 22), the network node 16 configured to, and/or comprising a radio interface 82 and/or comprising processing circuitry 84 configured to:
  determine a configured grant, the configured grant indicating an uplink (UL) transmission time for a wireless device 22;
  transmit the configured grant to the wireless device 22;
  determine information for adapting the UL transmission time based on a slot format, the adapted UL transmission time being different from the indicated UL transmission time in the configured grant; and
  transmit the information to the wireless device 22.

Example A2. The network node 16 of Example A1, where the information is configured to cause the wireless device 22 to skip a transmission on an UL symbol within a configured period.

Example B1. A communication system 10 including a host computer 24, the host computer 24 comprising:
  processing circuitry 42 configured to provide user data; and
  a communication interface 40 configured to forward the user data to a cellular network for transmission to a wireless device 22 (WD 22),
  the cellular network comprising a network node 16 having a radio interface 62 and processing circuitry 68, the network node 16 configured to, and/or the network node's processing circuitry 68 configured to:
  determine a configured grant, the configured grant indicating an uplink (UL) transmission time for a wireless device 22;
  transmit the configured grant to the wireless device 22;
  determine information for adapting the UL transmission time based on a slot format, the adapted UL transmission time being different from the indicated UL transmission time in the configured grant; and
  transmit the information to the wireless device 22.

Example B2. The communication system 10 of Example B1, further including the network node 16.

Example B3. The communication system 10 of Example B2, further including the WD 22, wherein the WD 22 is configured to communicate with the network node 16.

Example B4. The communication system 10 of Example B3, wherein:
  the processing circuitry 42 of the host computer 24 is configured to execute a host application 50, thereby providing the user data; and
  the WD 22 comprises processing circuitry 84 configured to execute a client application 92 associated with the host application 50.

Example C1. A method implemented in a network node 16, the method comprising:
  determining a configured grant, the configured grant indicating an uplink (UL) transmission time for a wireless device 22;
  transmitting the configured grant to the wireless device 22;
  determining information for adapting the UL transmission time based on a slot format, the adapted UL transmission time being different from the indicated UL transmission time in the configured grant; and
  transmitting the information to the wireless device 22.

Example C2. The method of Example C1, wherein the information is configured to cause a wireless device 22 to skip a transmission on an UL symbol within a configured period.

Example D1. A method implemented in a communication system 10 including a host computer 24, a network node 16 and a wireless device 22 (WD 22), the method comprising:
  at the host computer 24, providing user data; and
  at the host computer 24, initiating a transmission carrying the user data to the WD 22 via a cellular network comprising the network node 16, wherein the network node 16 transmits a configured grant indicating an uplink (UL) transmission time for a wireless device 22.

Example D2. The method of Example D1, further comprising, at the network node 16, transmitting the user data.

Example D3. The method of Example D2, wherein the user data is provided at the host computer 24 by executing a host application 50, the method further comprising, at the WD 22, executing a client application 92 associated with the host application 50.

Example E1. A wireless device 22 (WD 22) configured to communicate with a network node 16, the WD 22 configured to, and/or comprising a radio interface 82 and/or processing circuitry 84 configured to:
  receive a configured grant indicating an uplink (UL) transmission time for a wireless device 22; and
  adapt the UL transmission time based on an indicated slot format, the adapted UL transmission time being different from the indicated UL transmission time.

Example E2. The WD 22 of Example E1, wherein the adapted UL transmission time includes adapting the UL transmission time of an UL symbol indicated in the configured grant based on a transmission time of a downlink (DL)

symbol indicated in the slot format that conflicts with the transmission time of the UL symbol.

Example E3. The WD 22 of Example E1, wherein if the WD 22 is configured to use a next available UL symbol within a time window or after the time window, the adapted UL transmission time includes skipping a transmission occasion on an UL symbol within a configured period of the configured grant and using a next available UL symbol within the configured period.

Example E4. The WD 22 of Example E1, wherein if the UL/DL pattern is semi-statically configured in the configured grant, or if a time window is defined and there is no UL symbol within the time window, the adapted UL transmission time includes:

skipping a transmission occasion on an UL symbol within a configured period of the configured grant; and using a closest UL symbol within the configured period.

Example E5. The WD 22 of any one of Examples E3-E4, wherein a next available UL symbol or a closed UL symbol is set:

to a configured UL/DL pattern where an UL symbol is within one slot associated with a Radio Resource Control (RRC);

to the configured UL/DL pattern where the UL symbol is not within a current slot associated with the RRC configuration; or based on an indicated change of an UL to DL symbol in a slot format indicator (SFI).

Example E6. The WD 22 of Example E1, wherein if there is no available UL symbol within a time period, based on a network configuration, the time period is shorter than a configurable value, or based on at least one pattern from a set of specified UL/DL patterns, the adapted UL transmission time includes skipping transmission on an UL symbol within the configured time period.

Example F1. A communication system 10 including a host computer 24, the host computer 24 comprising:

processing circuitry 42 configured to provide user data; and a communication interface 40 configured to forward user data to a cellular network for transmission to a wireless device 22 (WD 22), the WD 22 configured to, and/or comprising a radio interface 82 and/or processing circuitry 84 configured to:
receive a configured grant indicating an uplink (UL) transmission time for a wireless device 22; and
adapt the UL transmission time based on an indicated slot format, the adapted UL transmission time being different from the indicated UL transmission time.

Example F2. The communication system 10 of Example F1, further including the WD 22.

Example F3. The communication system of Example F2, wherein the cellular network further includes a network node 16 configured to communicate with the WD 22.

Example F4. The communication system 10 of Example F2 or F3, wherein:

the processing circuitry 42 of the host computer 24 is configured to execute a host application 50, thereby providing the user data; and the WD's processing circuitry 84 is configured to execute a client application 92 associated with the host application 50.

Example G1. A method implemented in a wireless device 22 (WD 22), the method comprising:

receive a configured grant indicating an uplink (UL) transmission time for a wireless device 22; and adapt the UL transmission time based on an indicated slot format, the adapted UL transmission time being different from the indicated UL transmission time.

Example G2. The method of Example G1, wherein the adapted UL transmission time includes adapting the UL transmission time of an UL symbol indicated in the configured grant based on a transmission time of a downlink (DL) symbol indicated in the slot format that conflicts with the transmission time of the UL symbol.

Example G3. The method of Example G1, wherein if the WD 22 is configured to use a next available UL symbol within a time window or after the time window, the adapted UL transmission time includes skipping a transmission occasion on an UL symbol within a configured period of the configured grant and using a next available UL symbol within the configured period.

Example G4. The method of Example G1, wherein if the UL/DL pattern is semi-statically configured in the configured grant, or if a time window is defined and there is no UL symbol within the time window, the adapted UL transmission time includes:

skipping a transmission occasion on an UL symbol within a configured period of the configured grant; and using a closest UL symbol within the configured period.

Example G5. The method of Example G3-G4, wherein a next available UL symbol or a closed UL symbol is set:

to a configured UL/DL pattern where an UL symbol is within one slot associated with a Radio Resource Control (RRC);

to the configured UL/DL pattern where the UL symbol is not within a current slot associated with the RRC configuration; or based on an indicated change of an UL to DL symbol in a slot format indicator (SFI).

Example G6. The method of Example G1, wherein if there is no available UL symbol within a time period, based on a network configuration, the time period is shorter than a configurable value, or based on at least one pattern from a set of specified UL/DL patterns, the adapted UL transmission time includes skipping transmission on an UL symbol within the configured time period.

Example H1. A method implemented in a communication system 10 including a host computer 24, a network node 16 and a wireless device 22 (WD 22), the method comprising:

at the host computer 24, providing user data; and at the host computer 24, initiating a transmission carrying the user data to the WD 22 via a cellular network comprising the network node 16, wherein the WD 22 receives a configured grant indicating an uplink (UL) transmission time for a wireless device 22, and adapts the UL transmission time based on an indicated slot format, the adapted UL transmission time being different from the indicated UL transmission time.

Example H2. The method of Example 35, further comprising, at the WD 22, receiving the user data from the network node 16.

Example I1. A wireless device 22 (WD 22) configured to communicate with a network node 16, the WD 22 configured to, and/or comprising a radio interface 82 and/or processing circuitry 84 configured to:

adapt an UL transmission time based on an indicated slot format, the adapted UL transmission time being different from an UL transmission time indicated in a configured grant.

Example I2. The wireless device 22 of Example I1, wherein the adapted UL transmission time includes adapting the UL transmission time of an UL symbol indicated in the configured grant based on a transmission time of a downlink (DL) symbol indicated in the slot format that conflicts with the transmission time of the UL symbol.

Example I3. The wireless device 22 of Example I1, wherein if the WD 22 is configured to use a next available UL symbol within a time window or after the time window, the adapted UL transmission time includes skipping a transmission occasion on an UL symbol within a configured period of the configured grant and using a next available UL symbol within the configured period.

Example I4. The wireless device 22 of Example I1, wherein if the UL/DL pattern is semi-statically configured in the configured grant, or if a time window is defined and there is no UL symbol within the time window, the adapted UL transmission time includes:

skipping a transmission occasion on an UL symbol within a configured period of the configured grant; and using a closest UL symbol within the configured period.

Example I5. The wireless device 22 of any one of Example I3-I4, wherein a next available UL symbol or a closed UL symbol is set:

to a configured UL/DL pattern where an UL symbol is within one slot associated with a Radio Resource Control (RRC);

to the configured UL/DL pattern where the UL symbol is not within a current slot associated with the RRC configuration; or based on an indicated change of an UL to DL symbol in a slot format indicator (SFI).

Example I6. The wireless device 22 of Example I1, wherein if there is no available UL symbol within a time period, based on a network configuration, the time period is shorter than a configurable value, or based on at least one pattern from a set of specified UL/DL patterns, the adapted UL transmission time includes skipping transmission on an UL symbol within the configured time period.

Example J1. A communication system 10 including a host computer 24, the host computer 24 comprising:

a communication interface 40 configured to receive user data originating from a transmission from a wireless device 22 (WD 22) to a network node 16, the WD 22 configured to, and/or comprising a radio interface and/or processing circuitry 84 configured to: adapt an UL transmission time based on an indicated slot format, the adapted UL transmission time being different from an UL transmission time indicated in a configured grant.

Example J2. The communication system 10 of Example J1, further including the WD 22.

Example J3. The communication system 10 of Example J2, further including the network node 16, wherein the network node 16 is configured to, and/or comprises a radio interface 62 configured to communicate with the WD 22 and a communication interface 60 configured to forward to the host computer 24 the user data carried by a transmission from the WD 22 to the network node 16.

Example J4. The communication system 10 of Example J2 or J3, wherein:

the processing circuitry 42 of the host computer 24 is configured to execute a host application 50; and the WD's processing circuitry 84 is configured to execute a client application 92 associated with the host application 50, thereby providing the user data.

Example J5. The communication system 10 of Example J2 or J3, wherein:

the processing circuitry 42 of the host computer 24 is configured to execute a host application 50, thereby providing request data; and the WD's processing circuitry 84 is configured to execute a client application 92 associated with the host application 50, thereby providing the user data in response to the request data.

Example K1. A method implemented in a wireless device 22 (WD 22), the method comprising adapting an UL transmission time based on an indicated slot format, the adapted UL transmission time being different from an UL transmission time indicated in a configured grant.

Example K2. The method of Example K1, wherein the adapted UL transmission time includes adapting the UL transmission time of an UL symbol indicated in the configured grant based on a transmission time of a downlink (DL) symbol indicated in the slot format that conflicts with the transmission time of the UL symbol.

Example K3. The method of Example K1, wherein if the WD is configured to use a next available UL symbol within a time window or after the time window, the adapted UL transmission time includes skipping a transmission occasion on an UL symbol within a configured period of the configured grant and using a next available UL symbol within the configured period.

Example K4. The method of Example K1, wherein if the UL/DL pattern is semi-statically configured in the configured grant, or if a time window is defined and there is no UL symbol within the time window, the adapted UL transmission time includes:

skipping a transmission occasion on an UL symbol within a configured period of the configured grant; and using a closest UL symbol within the configured period.

Example K5. The method of any one of Example K3-K4, wherein a next available UL symbol or a closed UL symbol is set:

to a configured UL/DL pattern where an UL symbol is within one slot associated with a Radio Resource Control (RRC);

to the configured UL/DL pattern where the UL symbol is not within a current slot associated with the RRC configuration; or based on an indicated change of an UL to DL symbol in a slot format indicator (SFI).

Example K6. The method of Example K1, wherein if there is no available UL symbol within a time period, based on a network configuration, the time period is shorter than a configurable value, or based on at least one pattern from a set of specified UL/DL patterns, the adapted UL transmission time includes skipping transmission on an UL symbol within the configured time period.

Example K7. The method of Example K1, further comprising:

providing user data; and forwarding the user data to a host computer via the transmission to the network node.

Example L1. A method implemented in a communication system 10 including a host computer 24, a network node 16 and a wireless device 22 (WD 22), the method comprising:

at the host computer 24, receiving user data transmitted to the network node 16 from the WD 22, wherein the WD 22 adapting an UL transmission time based on an indicated slot format, the adapted UL transmission time being different from an UL transmission time indicated in a configured grant.

Example L2. The method of Example L1, further comprising, at the WD 22, providing the user data to the network node 16.

Example L3. The method of Example L2, further comprising:

at the WD 22, executing a client application 92, thereby providing the user data to be transmitted; and at the host computer 24, executing a host application 50 associated with the client application 92.

Example L4. The method of Example L2, further comprising:

at the WD 22, executing a client application 92; and at the WD 22, receiving input data to the client application 92, the input data being provided at the host computer 24 by executing a host application 50 associated with the client application 92, wherein the user data to be transmitted is provided by the client application 92 in response to the input data.

Example M1. A network node 16 configured to communicate with a wireless device 22 (WD 22), the network node 16 configured to, and/or comprising a radio interface 62 and/or processing circuitry 68 configured to:

receive uplink (UL) transmission based on an UL transmission time that has been adapted based on a slot format, the adapted UL transmission time being different from an UL transmission time indicated in a configured grant.

Example M2. The network node 16 of Example M1, wherein the adapted UL transmission time includes the UL transmission time of an UL symbol indicated in the configured grant being adapted based on a transmission time of a downlink (DL) symbol indicated in the slot format that conflicts with the transmission time of the UL symbol.

Example N1. A communication system 10 including a host computer 24, the host computer 24 comprising: a communication interface 40 configured to receive user data originating from a transmission from a wireless device 22 (WD 22) to a network node 16, the network node 16 configured to, and/or comprising a radio interface 62 and/or processing circuitry 68 configured to receive uplink (UL) transmission based on an UL transmission time that has been adapted based on a slot format, the adapted UL transmission time being different from an UL transmission time indicated in a configured grant.

Example N2. The communication system 10 of Example N1, further including the network node 16.

Example N3. The communication system 10 of Example N2, further including the WD 22, wherein the WD 22 is configured to communicate with the network node 16.

Example N4. The communication system 10 of Example N3, wherein:

the processing circuitry 42 of the host computer 24 is configured to execute a host application 50; and the WD 22 is configured to execute a client application 92 associated with the host application 50, thereby providing the user data to be received by the host computer 24.

Example O1. A method implemented in a network node 16, the method comprising receiving uplink (UL) transmission based on an UL transmission time that has been adapted based on a slot format, the adapted UL transmission time being different from an UL transmission time indicated in a configured grant.

Example P1. A method implemented in a communication system 10 including a host computer 24, a network node 16 and a wireless device 22 (WD 22), the method comprising:

at the host computer 24, receiving, from the network node 16, user data originating from a transmission which the network node 16 has received from the WD 22, wherein the network node 16 receives uplink (UL) transmission based on an UL transmission time that has been adapted based on a slot format, the adapted UL transmission time being different from an UL transmission time indicated in a configured grant.

Example P2. The method of Example P1, further comprising, at the network node 16, receiving the user data from the WD 22.

Example P3. The method of Example P2, further comprising, at the network node 16, initiating a transmission of the received user data to the host computer 24.

Example Q1. A network node 16, comprising:

a determination module 33 configured to:

determine a configured grant, the configured grant indicating an uplink (UL) transmission time for a wireless device 22; and determine information for adapting the UL transmission time based on a slot format, the adapted UL transmission time being different from the indicated UL transmission time in the configured grant; and a radio interface module 63 configured to:

transmit the configured grant to the wireless device 22; and transmit the information to the wireless device 22.

Example Q2. A wireless device 22, comprising:

a receiving module 35 configured to receive a configured grant indicating an uplink (UL) transmission time for a wireless device 22; and a configuring module 95 configured to adapt the UL transmission time based on an indicated slot format, the adapted UL transmission time being different from the indicated UL transmission time.

Example Q3. A wireless device 22, comprising:

an adapting module 97 configured to adapt an UL transmission time based on an indicated slot format, the adapted UL transmission time being different from an UL transmission time indicated in a configured grant.

Example Q4. A network node 16, comprising:

a reception module 77 configured to receive uplink (UL) transmission based on an UL transmission time that has been adapted based on a slot format, the adapted UL transmission time being different from an UL transmission time indicated in a configured grant.

Therefore, in NR TDD, adapting the UL transmission time in the WD 22 in a configured grant to the configured/indicated slot format advantageously avoids a confusion between network node 16 and WD 22, and allows the WD 22 to transmit UL data where a corresponding resource in a slot format assignment is a DL transmission resource, as described herein.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node for communication with a wireless device, the wireless device configured with a periodic uplink and downlink configuration of a slot, a first symbol of the slot being configured for uplink data transmission, the network node comprising:
processing circuitry configured to:
transmit an indication, to the wireless device, of a scheduling of a downlink data transmission on the first symbol, the scheduling of conflicting with the periodic uplink and downlink configuration, the conflict causing the wireless device to perform at least one operation; and
receive a data transmission from the wireless device on a second symbol of the slot that is different from the first symbol, the second symbol being subsequent in a time domain relative to the first symbol, the received data transmission being based on the at least one operation.

2. The network node of claim 1, wherein the indication corresponds to a slot format indicator, SFI, or dynamic signaling that is configured to change a function of the first symbol according to one of:
from an uplink resource to a downlink resource; and
from a downlink resource to an uplink resource.

3. The network node of claim 1, wherein the periodic uplink and downlink configuration corresponds to an uplink and downlink pattern of symbols having a predefined periodicity.

4. The network node of claim 1, wherein the second symbol corresponds to a next available symbol after the first symbol.

5. The network node of claim 1, wherein the second symbol occurs within a predefined time period that includes the first symbol.

6. A wireless device for communication with a network node, the wireless device being configured with a periodic uplink and downlink configuration of a slot, a first symbol of the slot being configured for uplink data transmission, the wireless device comprising:
processing circuitry configured to:
receive an indication of a scheduling of a downlink data transmission on the first symbol;
determine that the scheduling conflicts with the periodic uplink and downlink configuration; and
transmit data on a second symbol of the slot that is different from the first symbol, the second symbol being subsequent in a time domain relative to the first symbol, the data transmission being based on the determination of the conflict.

7. The wireless device of claim 6, wherein the indication corresponds to a slot format indicator, SFI, or dynamic signaling that is configured to change a function of the first symbol according to one of:
from an uplink resource to a downlink resource; and
from a downlink resource to an uplink resource.

8. The wireless device of claim 6, wherein the second symbol occurs within a predefined time period that includes the first symbol.

9. The wireless device of claim 6, wherein the periodic uplink and downlink configuration corresponds to an uplink and downlink pattern of symbols having a predefined periodicity.

10. The wireless device of claim 6, wherein the second symbol corresponds to a next available symbol after the first symbol.

11. A method for a network node for communication with a wireless device, the wireless device configured with a periodic uplink and downlink configuration of a slot, a first symbol of the slot being configured for uplink data transmission, the method comprising:

transmitting an indication, to the wireless device, of a scheduling of a downlink data transmission on the first symbol, the scheduling conflicting with the periodic uplink and downlink configuration, the conflict causing the wireless device to perform at least one operation; and receiving a data transmission from the wireless device on a second resource symbol of the slot that is different from the first symbol, the second symbol being subsequent in a time domain relative to the first symbol, the received data transmission being based on the at least one operation.

12. The method of claim 11, wherein the indication corresponds to a slot format indicator, SFI, or dynamic signaling that is configured to change the function of the first symbol according to one of:

from an uplink resource to a downlink resource; and
from a downlink resource to an uplink resource.

13. The method of claim 11, wherein the periodic uplink and downlink configuration corresponds to an uplink and downlink pattern of symbols having a predefined periodicity.

14. The method of claim 11, wherein the second symbol corresponds to a next available symbol after the first symbol.

15. The method of claim 11, wherein the second symbol occurs within a predefined time period that includes the first symbol.

16. A method for a wireless device for communication with a network node, the wireless device being configured with a periodic uplink and downlink configuration of a slot, a first symbol of the slot being configured for uplink data transmission, the method comprising:

receiving an indication of a scheduling of a downlink data transmission on the first symbol;

determining that the scheduling conflicts with the periodic uplink and downlink configuration; and transmitting data on a second symbol of the slot that is different from the first symbol, the second symbol being subsequent in a time domain relative to the first symbol, the data transmission being based on the determination of the conflict.

17. The method of claim 16, wherein the indication corresponds to a slot format indicator, SFI, or dynamic signaling that is configured to change a function of the first symbol according to one of:

from an uplink resource to a downlink resource; and
from a downlink resource to an uplink resource.

18. The method of claim 16, wherein the second symbol occurs within a predefined time period that includes the first symbol.

19. The method of claim 16, wherein the periodic uplink and downlink configuration corresponds to an uplink and downlink pattern of symbols having a predefined periodicity.

20. The method of claim 16, wherein the second symbol corresponds to a next available symbol after the first symbol.

* * * * *